(12) United States Patent
Guillot et al.

(10) Patent No.: US 8,816,228 B2
(45) Date of Patent: Aug. 26, 2014

(54) WIRELESS SWITCHING DEVICE

(75) Inventors: Alain Guillot, Fleac (FR); Dominique Benni, Mornac (FR); Francis Chauvet, Mouthiers (FR); Patrice Thizon, Ruelle sur Touvre (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 195 days.

(21) Appl. No.: 13/348,868

(22) Filed: Jan. 12, 2012

(65) Prior Publication Data

US 2012/0199454 A1    Aug. 9, 2012

(30) Foreign Application Priority Data

Feb. 8, 2011   (FR) ...................................... 11 50984

(51) Int. Cl.
*H01H 13/14*     (2006.01)
*G05B 19/00*     (2006.01)

(52) U.S. Cl.
USPC ............ 200/341; 200/47; 307/10.3; 340/5.62

(58) Field of Classification Search
USPC ........ 200/341, 520, 276, 276.1, 47; 340/5.62; 307/10.4, 10.3
See application file for complete search history.

(56) References Cited

U.S. PATENT DOCUMENTS

| | | | |
|---|---|---|---|
| 6,812,898 B2 * | 11/2004 | Doub et al. ................... | 343/702 |
| 7,060,922 B2 * | 6/2006 | Hoehne et al. ................ | 200/341 |
| 7,227,447 B2 * | 6/2007 | Ohtaki et al. ................ | 340/5.62 |
| 8,542,092 B2 * | 9/2013 | Lumley et al. ................ | 340/5.62 |
| 2002/0134656 A1 * | 9/2002 | Alain et al. ................... | 200/341 |
| 2002/0190610 A1 | 12/2002 | Andre et al. | |
| 2012/0075063 A1 * | 3/2012 | Sakamoto et al. ........... | 340/5.62 |

FOREIGN PATENT DOCUMENTS

| | | |
|---|---|---|
| EP | 1 607 993 A1 | 12/2005 |
| EP | 1 625 984 A2 | 2/2006 |
| FR | 2 826 160 A1 | 12/2002 |

OTHER PUBLICATIONS

French Preliminary Search Report and Written Opinion issued Sep. 28, 2011, in French 1150984, filed Feb. 8, 2011 (with English Translation of Categories of Cited Documents).

* cited by examiner

*Primary Examiner* — Felix O Figueroa
(74) *Attorney, Agent, or Firm* — Oblon, Spivak, McClelland, Maier & Neustadt, L.L.P.

(57) ABSTRACT

A wireless switching device with an actuating member that can move along a main axis between an idle position and a working position, a spring stressed by force by the actuating member in a direction substantially parallel to the main axis, a switching assembly that can include a plunger arranged to be actuated by the actuating member and a wireless transmitter module provided with an antenna for sending a message to a receiver module in the event of an action on the plunger. The antenna can be arranged prominently on the switching assembly in a direction substantially parallel to the main axis and the spring of helical type being arranged coaxially to the antenna.

12 Claims, 5 Drawing Sheets

WIRELESS SWITCHING DEVICE

The present invention relates to a wireless switching device, more specifically to a wireless switching device for example of the push-button or limit switch type.

BACKGROUND OF THE INVENTION

In a push-button, the switching is produced by a direct human action whereas for a limit switch, the switching originates as a general rule from an external mechanical action such as, for example, the movement of a door or the pulling of a cable.

The development of wireless technologies in all technical fields has led to the emergence of new constraints, notably in the field of industrial button-making or in that of limit switches. In a switching device of this type, a wireless communication module occupies a space that is not inconsiderable because it comprises an electronic card, an antenna and an energy source, this energy source possibly being a battery or a generator of electrical energy suitable for converting a mechanical energy into electrical energy. Now compactness requirements have to be observed, notably to enable a user to replace his or her current switching device in its wired version with a new switching device operating by wireless technology.

The document EP1625984 discloses a switching device. This switching device comprises an actuator and a reader provided with an antenna, the actuator being controlled if a code sent by a transponder situated within range of the reader corresponds to a stored code.

The documents FR2826160, US2002/190610 and EP1607993 describe wireless switching devices.

BRIEF SUMMARY OF THE INVENTION

The aim of the invention is therefore to propose a wireless switching device which is reliable and which has a particularly compact architecture.

This aim is achieved with a wireless switching device comprising:
  an actuating member that can move along a main axis between an idle position and a working position,
  a spring stressed by force by the actuating member in a direction substantially parallel to the main axis,
  a switching assembly comprising a plunger arranged to be actuated by the actuating member and a wireless transmitter module provided with an antenna for sending a message to a receiver module in the event of an action on the plunger,
  the antenna being arranged prominently on the switching assembly,
  the actuating member comprising a part forming a hollow axial internal space inside which the antenna is housed.

According to a particular feature of the device of the invention, the spring is arranged coaxially to the actuating member.

In a push-button-type switching device, the spring is arranged outside the part of the actuating member forming the internal space. A switching device of push-button type comprises a control assembly provided with the actuating member and a fastening base fastened to the control assembly and intended to accommodate the switching assembly. The control assembly comprises a body in which the actuating member is driven in translation and the spring is positioned bearing on the one hand against the body and on the other hand against the actuating member.

Typically, a switching device of push-button type is assembled through an opening produced in a wall, the control assembly and the switching assembly being assembled on either side of the wall, the antenna being arranged to pass through the plane formed by the wall so as to extend on one side or the other of the wall.

In a switching device of limit switch type, the spring is arranged inside the part of the actuating member forming the internal space. This device comprises a sealed housing enclosing the actuating member and the switching assembly. Preferentially, the spring bears on the one hand against the switching assembly and on the other hand against the actuating member.

In a switching device of limit switch type, the spring can be arranged outside the part of the actuating member forming the internal space. It also comprises a sealed housing enclosing the actuating member and the switching assembly. In this configuration, the switching assembly is, for example, arranged in the housing so as to be able to slide with the housing relative to the actuating member.

According to the invention, the switching assembly is of a single piece and comprises a housing enclosing a generator of electrical energy suitable for cooperating with the plunger and used to convert a mechanical energy imparted by the plunger into an electrical energy intended to power the wireless transmitter module. The generator of electrical energy is, for example, of electromagnetic type and comprises a magnetic circuit provided with a fixed part and a mobile part and an electromagnetic coil through which the magnetic circuit passes.

BRIEF DESCRIPTION OF THE DRAWINGS

Other features and advantages will emerge from the following detailed description by referring to an embodiment given as an example and represented by the appended drawings in which.

DETAILED DESCRIPTION OF THE INVENTION

Figure 1:
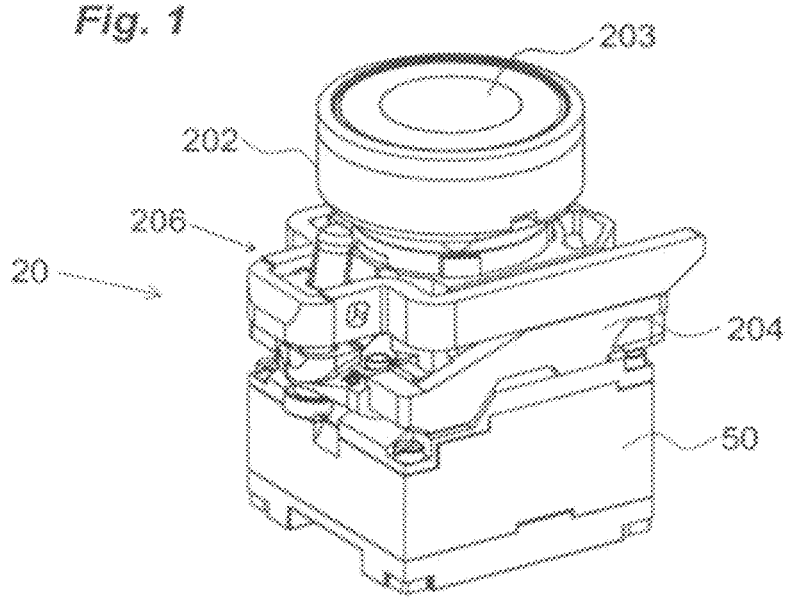
FIG. 1 represents a switching device of push-button type according to the invention.
Figure 2:
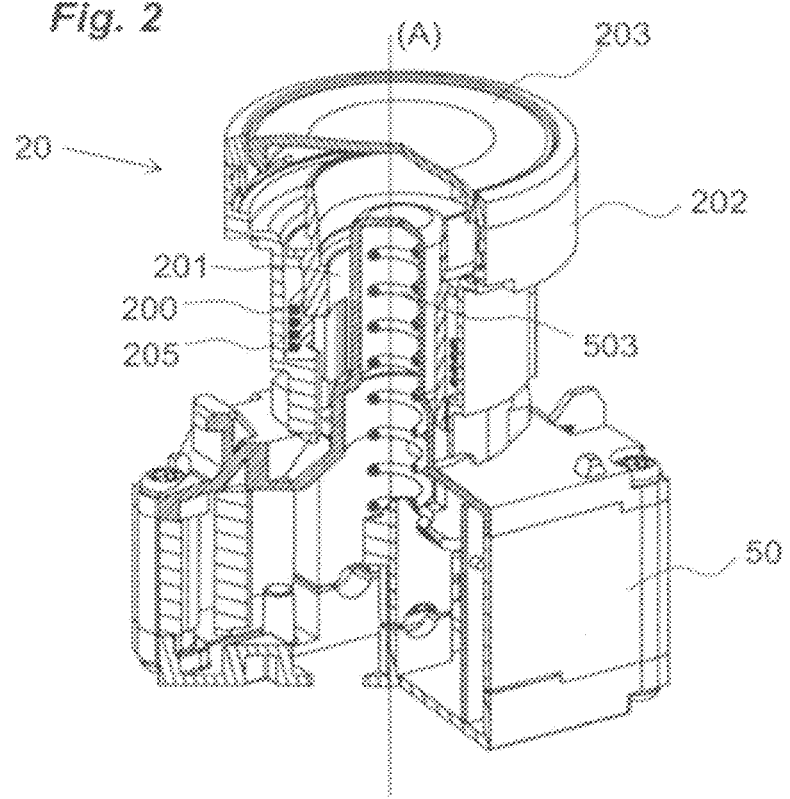
FIG. 2 represents, in semi-open view, the switching device of FIG. 1.
Figure 3:
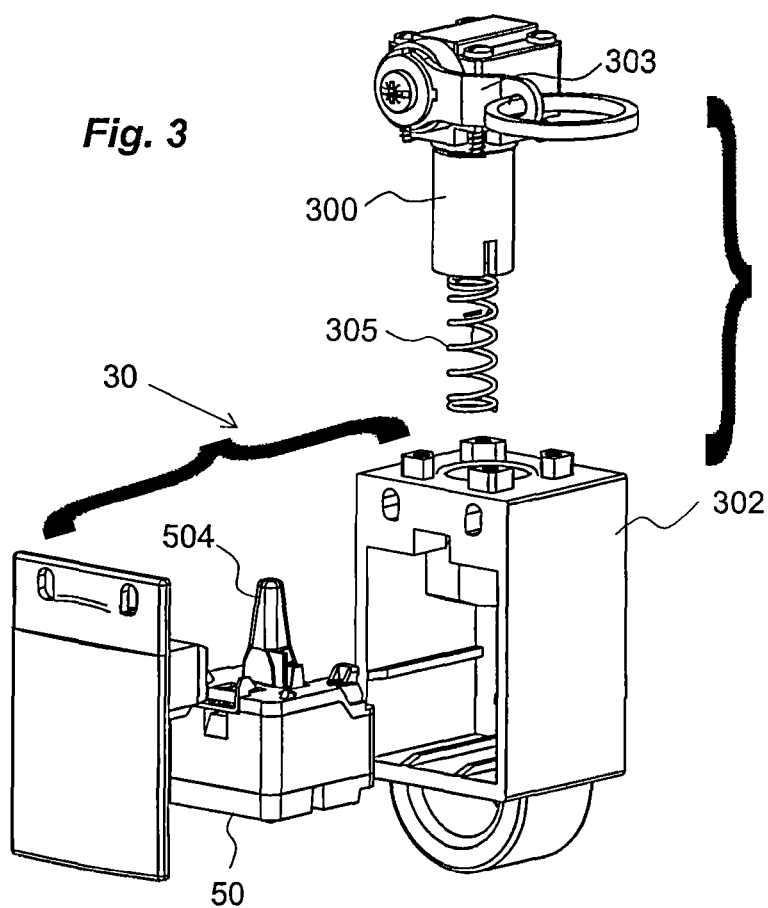
FIG. 3 represents, in exploded view, a switching device of limit switch type according to the invention.
Figure 4:
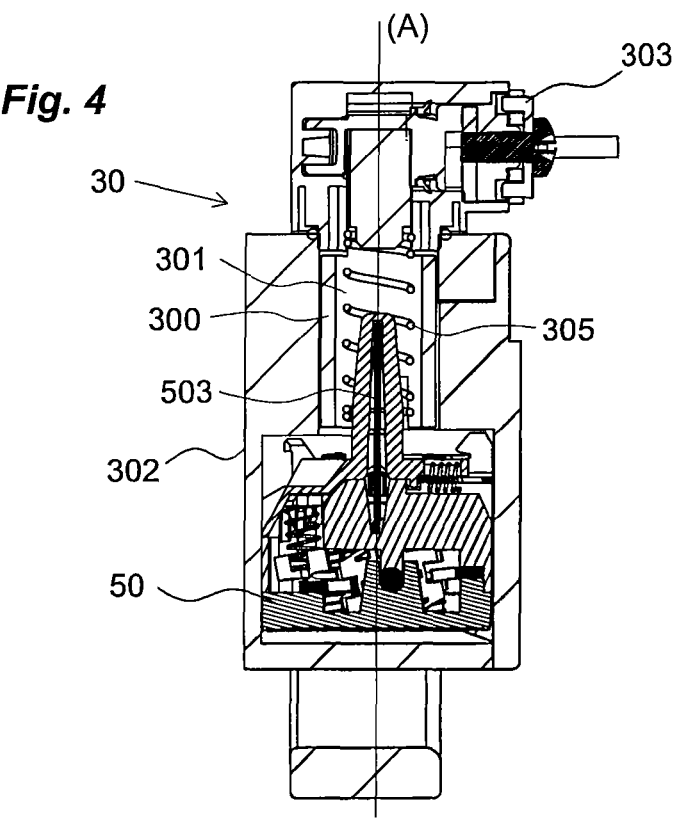
FIG. 4 represents, seen in axial longitudinal cross section, the switching device of FIG. 3.
Figure 5:
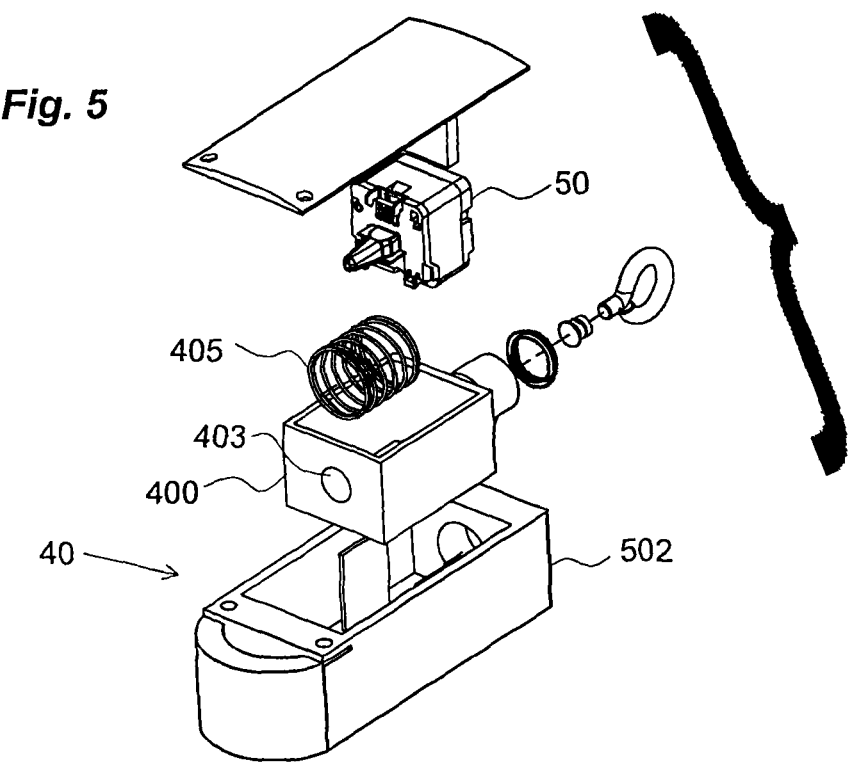
FIG. 5 represents, in exploded view, a switching device of limit switch type according to the invention.
Figure 6:
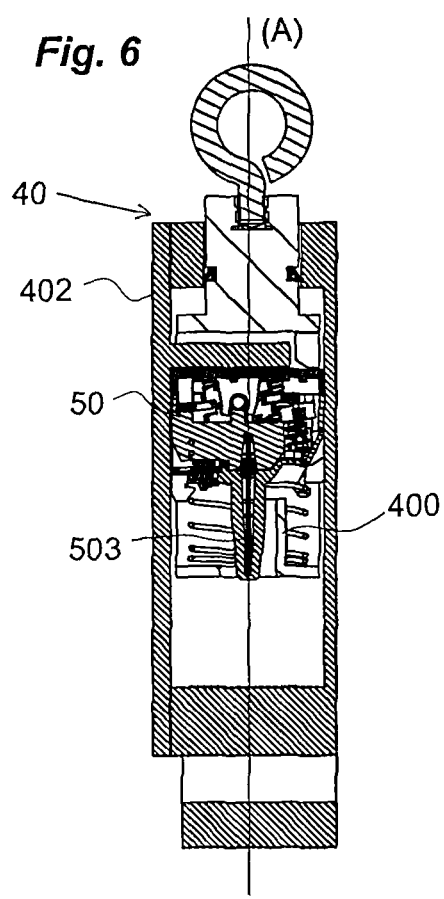
FIGS. 6 and 7 represent, seen along two axial longitudinal cross sections, the switching device of FIG. 5.
Figure 7:
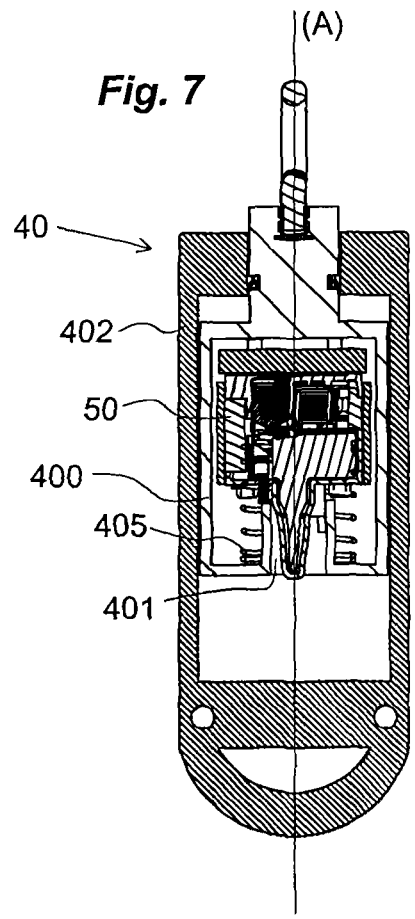

The invention relates to a switching device for example of push-button type 20 as represented in FIGS. 1 and 2 or of limit switch type 30, 40 as represented in FIGS. 3 to 7. In FIGS. 3 to 7, two types of limit switch can be distinguished, one operated by a pivoting lever (FIGS. 3 and 4), the other with axial operation (FIGS. 5 to 7).

The switching device of the invention has the particular feature of including wireless communication so that a message can be sent to a remote receiver module through a wireless communication network. In all its embodiments, the switching device includes an actuating member 200, 300, 400, the activation of which is used to actuate a switching assembly 50 dedicated to sending a message to a remote receiver module.

In a switching device of push-button type 20, a control assembly comprising the actuating member can, for example, be separated from the switching assembly 50. In a switching device of limit switch type, the control assembly and the switching assembly 50 are, for example, combined inside one and the same main housing.

Figure 8:
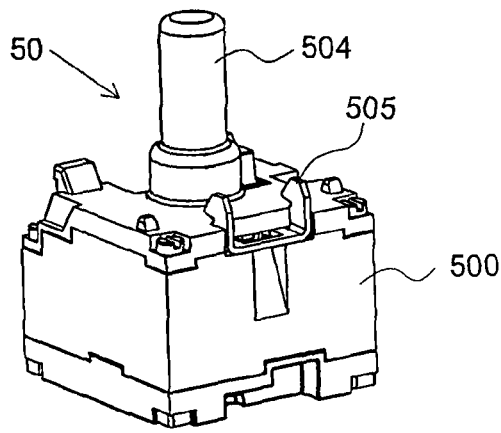
FIG. 8 represents a switching assembly employed in the switching device of the invention.
Figure 9:
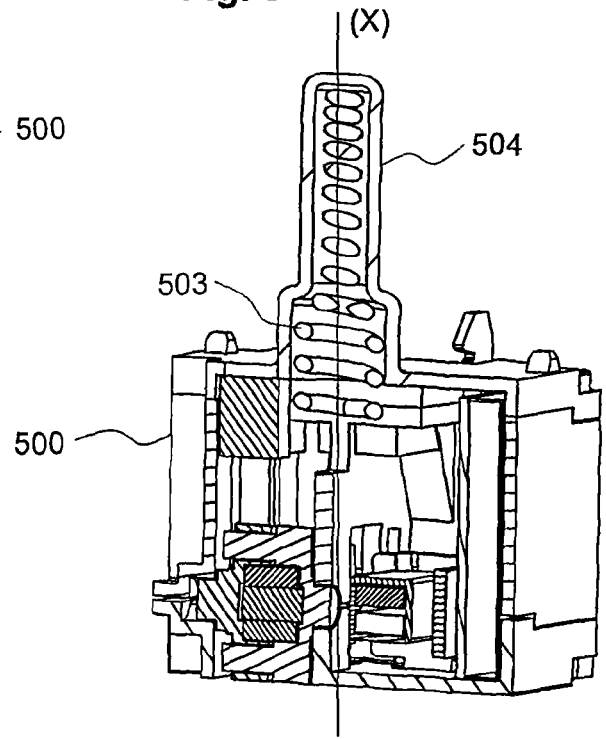
FIG. 9 represents, seen in cross section, the switching assembly shown in FIG. 8.
Figure 10:
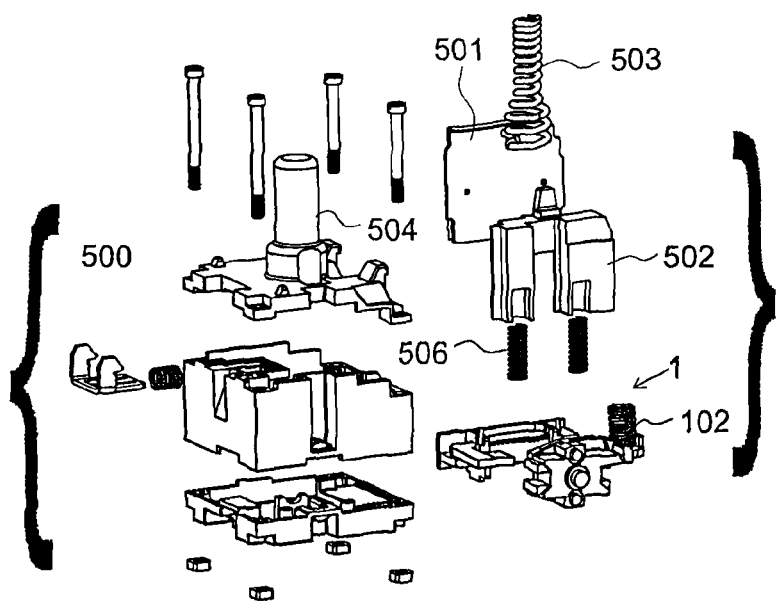
FIG. 10 represents, in exploded view, the switching assembly shown in FIGS. 8 and 9.

With reference to FIGS. 8 to 10, the switching assembly 50 of the device comprises a housing 500, for example in three parts, enclosing at least one electronic unit 501 provided with a wireless transmitter module and an energy source intended to power the wireless transmitter module. This energy source may be a battery, a button cell or a generator 1 of electrical energy for converting a mechanical energy into electrical energy. Preferentially, the switching assembly 50 comprises such a generator of electrical energy so that the wireless switching device can be made perfectly independent. Hereinafter in the description, we will more particularly focus on a switching assembly 50 provided with such a generator 1 of electrical energy.

According to the invention, the generator 1 of electrical energy housed in the housing 500 is, for example, of electromagnetic induction type or of piezoelectric type, and can therefore be used to convert a mechanical energy into an electrical energy intended to power the electronic unit 501. In the device of the invention, the mechanical energy is imparted by the movement of a plunger 502 cooperating with the actuating member 200, 300, 400 of the switching device.

Figure 11:
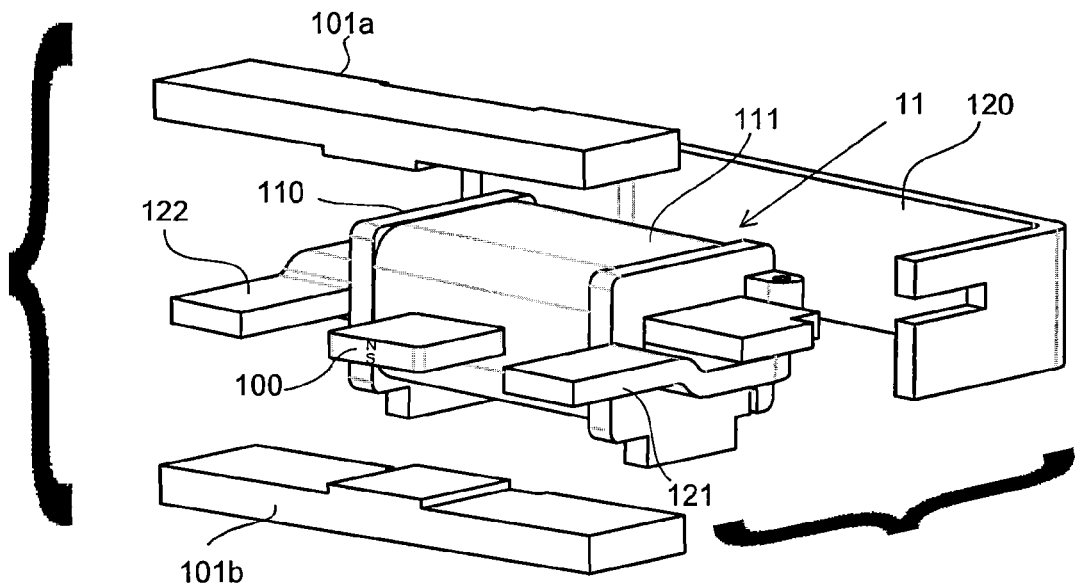
FIG. 11 represents, in exploded view, the energy generator employed in the invention.

An electromagnetic induction energy generator 1 is represented in FIG. 11. It generates an electrical current in an excitation coil 11 by causing the magnetic flux passing through the coil 11 to vary by an external mechanical action.

With reference to FIG. 11, the generator 1 notably comprises said excitation coil 11 and a magnetic circuit through which a magnetic field can circulate, said magnetic circuit being formed by a fixed part and a mobile part 10.

The magnetic flux in the magnetic circuit is defined by the instantaneous angular position of the mobile part 10 relative to the fixed part so that the movement of the mobile part 10 relative to the fixed part creates a variation of the magnetic flux through the coil 11 which results in the creation of an electrical current in the coil 11. The voltage created at the terminals of the coil 11 by the variation of the magnetic flux depends on the time and therefore the speed of displacement of the mobile part 10 relative to the fixed part.

The excitation coil 11 comprises an armature 110 made of an insulating material, on which is wound a winding 111 of n turns of a conductive wire. The armature 110 has a central opening formed along a longitudinal axis and whose dimensions are designed to be able to be passed through a number of times by the magnetic circuit. In FIG. 11, the fixed part of the magnetic circuit passes twice through the central opening of the coil 11 forming a loop. The magnetic circuit therefore passes a first time through the central opening of the coil 11, then goes around the coil 11 to form the loop, and passes a second time through the central opening of the coil 11.

The mobile part 10 of the magnetic circuit is, for example, H-shaped, comprising, for example, a permanent magnet 100 held between two parallel layers 101a, 101b of ferromagnetic material, a top layer 101a and a bottom layer 101b. This mobile part 10 is mounted to rotate on a horizontal rotation axis perpendicular to the longitudinal axis of the central opening of the armature 110. A spring 102 is arranged to enable the mobile part 10 to revert to its initial position after actuation.

The fixed part of the magnetic circuit is made of a material with strong magnetic permeability such as a ferromagnetic material. With reference to FIG. 11, the fixed part comprises a U-shaped base 120 straddling the excitation coil 11. The fixed part of the magnetic circuit also comprises a first arm 121 and a second arm 122 which are distinct, unconnected and non-identical, one of the arms being the mirror-image of the other. The first arm 121 is linked to the first end of the base 120 whereas the second arm 122 is linked to the second end of the base 120. These two arms 121, 122 are L-shaped and separately pass through the central opening of the armature 110 along two planes parallel to the longitudinal axis of the central opening of the coil 11. The second ends of each of the arms 121, 122 are positioned on either side of the permanent magnet 100 of the mobile part 10 and between the two ferromagnetic layers 101a, 101b of the mobile part 10. Each arm 121, 122 forms an abutment for the mobile part 10 and defines two opposing bearing lands, a top bearing land and a bottom bearing land. The mobile part 10 has a degree of freedom in rotation between the abutments formed by each of the arms 121, 122.

Since the base 120 is arranged to be positioned on either side of the coil 11, the magnetic field circulating in the arms 121, 122 always passes through the central opening of the coil 11 in the same direction. Consequently, the magnetic field passes through the central opening of the excitation coil 11 twice in the same direction.

Figure 12A:
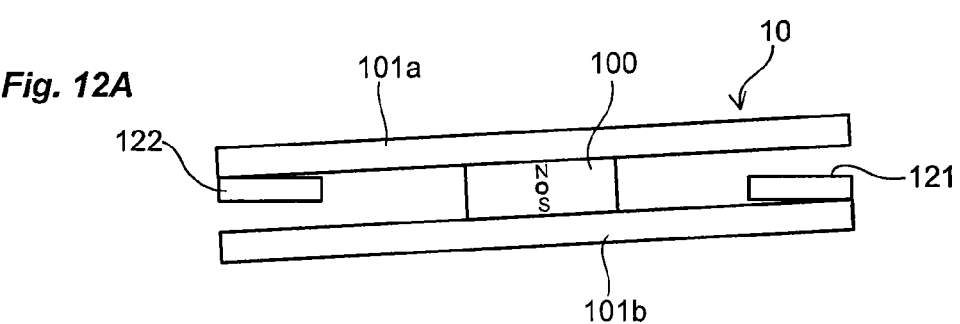
FIGS. 12A and 12B show the two operating positions of the energy generator represented in FIG. 11.
Figure 12B:
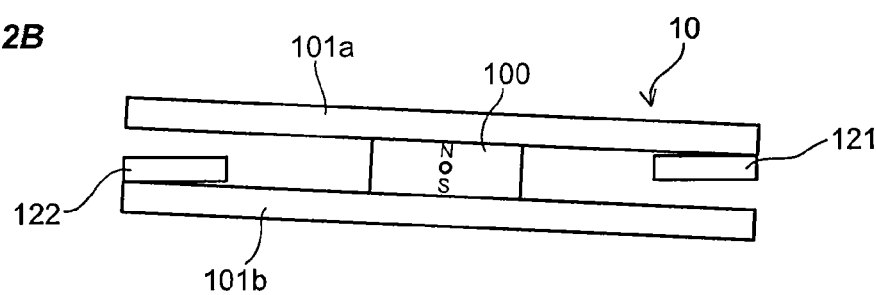

With reference to FIGS. 12A and 12B, it can be seen that the mobile part 10 performs a seesaw movement about its axis and can assume two distinct extreme positions defined by the abutments, in each of which the mobile part 10 is retained by magnetic forces. When the mobile part 10 is released from one of its extreme positions and moved beyond a central balance position, it is instantaneously attracted by the magnetic effect to the other extreme position. This phenomenon is notably described in the prior patent application GB 1 312 927.

According to the invention, the energy generator 1 is housed in the housing 500 and cooperates mechanically with the actuating member 200, 300, 400 via a mobile plunger 502 which can be actuated in translation by the actuating member. This plunger 502 is housed in the housing 500 and converts the movement of the actuating member between its two positions into a movement of the mobile part 10 of the generator 1 between its two positions.

The transition of the mobile part 10 of the generator 1 from a first position to a second position generates a first quantity of energy in the form of a first voltage which can be used downstream by the electronic unit 501. Depending on the electronics installed in the electronic unit 501, it is also possible to generate a second quantity of energy, in the form of a second voltage, upon the transition of the mobile part 10 of the generator 1 from its second position to its first position. The first quantity of energy and the second quantity of energy generated in a reciprocating movement of the mobile part 10 of the generator 1 can each be employed by the electronic unit 501 to send a distinct message. When the mobile part 10 of the generator 1 performs a reciprocating movement, the two voltages generated in fact have opposite signs, the first voltage being, for example, positive and the second voltage negative, which enables the electronic unit to distinguish whether the actuating member 200, 300, 400 is being depressed or released and to send two different messages for each of the actions. For the go part of the reciprocating movement, the mobile part 10 of the generator is set in motion by a pressure on the actuating member, and for the return, the mobile part 10 reverts to its initial position under the action of the spring 102.

The actuating member 200, 300, 400 is displaced along a main axis (A) and can assume two distinct positions, an idle position in which a return spring 205, 305, 405, for example of helical type, is released, and a working position in which the return spring is compressed. The idle position of the actuating member corresponds, for example, to the first position of the mobile part of the energy generator 1 and the working position to the second position of the mobile part of the energy generator 1.

Furthermore, the electronic unit 501 comprises a device for accumulating the electrical energy generated by the generator 1 and the wireless transmitter module includes an antenna 503. The wireless transmitter module is, for example, of radio-frequency type and is powered by the current produced by the generator 1 via the energy accumulation device. Using the antenna 503, it can send a message to a remote receiver module (not represented) which includes a corresponding antenna enabling it to receive the message. The wireless communication protocol used between the wireless transmitter module and the receiver module will be, for example, "ZIGBEE". In a variant embodiment, the transmitter module may be of infrared type. The message may comprise a number of identical successive frames and may notably comprise a unique identifier of the switching device enabling the receiver module to identify the device that has been actuated. The receiver module will include, for example, a table listing all the devices with which it is paired and the state of each of these devices.

According to the invention, the housing 500 of the switching assembly 50 includes a recess forming an elongate prominence 504 on the housing and in which the antenna 503 is housed. As represented in FIGS. 4 and 6, the antenna 503 is, for example, produced in the form of an electrical track on a printed circuit. As represented in FIGS. 2, 9 and 10, the antenna 503 may also take the form of a spring housed in the recess produced in the housing, or any other form suitable for being housed in the recess provided. Fastening means 505 may also be employed to fasten the switching assembly 50 to complementary means.

According to the invention, the plunger 502 of the switching assembly is positioned in proximity to the base of the antenna 503, and its displacement is produced parallel to the axis (X) of the antenna 503. This plunger 502 is mounted on two springs 506 mounted axially in the switching assembly 50.

According to the invention, the actuating member 200, 300, 400 of the switching device comprises, for example, a part, for example of generally cylindrical form, having an open face opening onto a hollow axial internal space 201, 301, 401 of the actuating member. According to the invention, the switching assembly 50 is arranged in the switching device so that the prominence 504 housing the antenna 503 and produced on the housing 500 of the switching assembly is inserted along the main axis (A) in the hollow internal space 201, 301, 401 of the actuating member 200, 300, 400. In this way, the switching device is made particularly compact. This particular arrangement is common to all the switching devices of the invention, whether of push-button type or of limit switch type.

Moreover, a switching device of push-button type is intended to be fastened through a circular opening of standardized diameter formed on a metallic wall, such as, for example, the door of an electrical enclosure. The control assembly comprising the actuating member 200 and the switching assembly 50 are intended to be fastened on either side of this wall. The arrangement of the antenna 503 inside the internal space 201 formed in the actuating member 200 enables the antenna 503 to pass through the plane formed by the wall. By virtue of this arrangement, the device can thus transmit from both sides of the wall, that is to say towards the exterior or towards the interior of the enclosure if the wall is the door of an electrical enclosure. More specifically, in FIGS. 1 and 2, the control assembly of the switching device of push-button type comprises a body 202 of generally cylindrical form, a control button 203 arranged in said body and linked mechanically to the actuating member 200 to drive it in translation in the body 202. The switching device of push-button type also comprises the base 204 (represented only in FIG. 1) fastened on the one hand to the body 202 of the control assembly and comprising reception means enabling the switching assembly 50 to be accommodated by its fastening means 505. This base 204 is situated on the same side of the wall as the switching assembly 50 and has a central opening enabling the antenna 503 of the switching assembly 50 to pass through to the internal space 201 of the actuating member 200. The control assembly also comprises a return spring 205 of helical type positioned coaxially to the cylindrical part of the actuating member 200, outside of the latter, by bearing on the one hand against an internal part of the body 202 of the control assembly and on the other hand against the actuating member 200. Since this spring 205 is necessary for the operation of the device, its positioning could only be outside the actuating member 200, the internal space 201 being occupied by the antenna 503. The switching device also comprises a fastening device 206 enabling the push-button to be fastened to a wall. Such a fastening device is described in detail in the published Patent EP0889564 or its correspondent U.S. Pat. No. 6,050,528. Other fastening solutions can obviously be envisaged for the switching device of the invention. When the switching assembly is fastened by virtue of the base to the control assembly, the actuating member 200 is intended to cooperate with the plunger 502 of the switching assembly 50 in order to drive it in translation towards the interior of the switching assembly.

In FIGS. 3 to 7, the switching device of limit switch type comprises, in its two types of embodiment, a housing 302, 402, for example seal-tight, enclosing the switching assembly 50 and the actuating member 300, 400. Since the devices of limit switch type are not confined in enclosures, the latter need to have a good sealing index to withstand external attack. The use of a self-powered switching assembly means that the seal-tightness of the device is reinforced since no cable is necessary. The use of an electrical energy generator also makes it possible to avoid any maintenance operation such as the replacement of a spent button cell or battery and therefore avoid any opening of the housing likely to violate the seal-tightness of the device. The switching device also comprises a return spring 305, 405 of helical type positioned coaxially to the cylindrical part of the actuating member 300, 400 and bearing on the one hand against the switching assembly 50 and on the other hand against the actuating member 300, 400. In the pivoting lever limit switch, the return spring 305 is situated inside the cylindrical part of the actuating member 300. In the axial operation limit switch, the return spring 405 is positioned outside the cylindrical part of the actuating member 400. In the pivoting lever limit switch, the actuation of the plunger 502 of the switching assembly 50 is, for example, produced by displacement of the actuating member and in the axial operation limit switch, the actuation of the plunger 502 is produced by displacement of the housing 402.

In the pivoting lever limit switch, the actuating member 300 is actuated in translation by a cam attached in rotation to a pivoting control head 303. In the axial operation limit switch, the actuating member 400 is fixed and the housing 402 attached in translation to the switching assembly 50 is mobile in translation relative to the actuating member 400. In the latter configuration, the actuating member 400 is, for example, in the form of a frame positioned inside the housing 402 and inside which is positioned the switching assembly 50. The housing 402 comprises means for driving the switching assembly 50 in translation against the actuating member 400. An axial opening 403 produced on the actuating member 400 allows for the passage of the prominence 504 of the switching assembly 50 when the device is actuated. With this arrangement, the housing 402 can, for example, take the form of an ergonomic handle.

The configuration of a limit switch in wireless mode makes it possible to do away with any wiring, and thus to be able to arrange the device in a number of types of configuration, for example by suspending it with a simple wire or cable.

The switching device of the invention thus makes it possible to propose a wireless and perfectly stand alone solution, without compromising the compactness of such a device. The arrangement of the antenna inside the actuating member 200, 300, 400 and of the return spring 205, 305, 405 notably makes it possible to satisfy this compactness objective without affecting performance levels, notably in terms of radio transmission.

Obviously, it is possible, without departing from the framework of the invention, to imagine other variants and refinements of detail and similarly to envisage the use of equivalent means.

The invention claimed is:

1. A wireless switching device comprising:
an actuating member movable along a main axis of the device, between an idle position and a working position,
a spring stressable by force from the actuating member in a direction substantially parallel to the main axis, and
a switching assembly including a plunger arranged to be actuated by the actuating member, and a wireless transmitter module provided with an antenna to output a signal responsive to an action on the plunger,
wherein
the antenna is arranged in the switching assembly such that a portion of the antenna is surrounded by an elongate prominence of the switching assembly,
the actuating member includes a part forming a hollow axial internal space inside which the elongate prominence and the antenna are housed, and
the spring, the part of the actuating member forming the hollow axial internal space, the elongate prominence, and the antenna overlap in a plane perpendicular to the main axis.

2. The device according to claim 1, wherein the spring is arranged coaxially with the actuating member.

3. The device according to claim 2, wherein the spring is arranged outside the part of the actuating member forming the hollow axial internal space.

4. The device according to claim 3, further comprising a control assembly including the actuating member and a fastening base fixed to the control assembly so as to accommodate the switching assembly.

5. The device according to claim 4,
wherein the control assembly includes a body in which the actuating member is driven in translation, and
wherein a first end of the spring is positioned so as to bear against the body, and a second end of the spring is positioned so as to bear against the actuating member.

6. The device according to claim 4 or 5, wherein the device is configured to be assembled through an opening produced in a wall, such that the control assembly and the switching assembly are assembled on either side of the wall, and the antenna is arranged to pass through a plane formed by the wall.

7. The device according to claim 1, wherein the switching assembly includes a housing enclosing a generator of electrical energy suitable for cooperating with the plunger and used to convert a mechanical energy imparted by the plunger into an electrical energy to power the wireless transmitter module.

8. The device according to claim 7, wherein the generator of electrical energy is an electromagnetic generator and includes a magnetic circuit provided with a fixed part and a mobile part and an electromagnetic coil through which the magnetic circuit passes.

9. The device according to claim 1, wherein the spring is a helical spring.

10. The device according to claim 1, wherein an end of the antenna closest to a control button of the device is closer to the control button than an end of the spring closest to the control button.

11. The device according to claim 1, wherein an end of the elongate prominence closest to a control button of the device is closer to the control button than an end of the spring closest to the control button.

12. The device according to claim 1,
wherein a first end of the antenna closest to a control button of the device and a first end of the elongate prominence closest to the control button of the device are closer to the control button than a first end of the spring closest to the control button, and
wherein a second end of the antenna opposite the first end thereof and a second end of the elongate prominence opposite the first end thereof are further away from the control button than a second end of the spring opposite the first end thereof.

* * * * *